(12) United States Patent
Kuo

(10) Patent No.: US 9,273,993 B2
(45) Date of Patent: Mar. 1, 2016

(54) OPTICAL SUBASSEMBLY TESTING SYSTEM

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/510,352

(22) Filed: Oct. 9, 2014

(65) Prior Publication Data

US 2015/0117855 A1   Apr. 30, 2015

(30) Foreign Application Priority Data

Oct. 31, 2013 (TW) .............................. 102139449 A

(51) Int. Cl.
*G01J 1/00* (2006.01)

(52) U.S. Cl.
CPC ........................................ *G01J 1/00* (2013.01)

(58) Field of Classification Search
CPC .. G01B 5/0009; G02B 6/4208; G02B 6/4224; G02B 6/4228; G02B 6/00; G02B 6/4231; G02B 7/027; Y10T 29/49133; G01J 1/00; H04B 10/07
USPC ............. 398/25, 138, 139, 164, 147; 385/147
See application file for complete search history.

(56) References Cited

U.S. PATENT DOCUMENTS

| 5,841,544 A * | 11/1998 | Dautartas ............. | G01B 5/0009 228/180.21 |
| 8,873,030 B2 * | 10/2014 | Huang .................. | G06F 3/0418 356/213 |
| 2004/0091231 A1 * | 5/2004 | Hofmeister ............ | H04B 10/07 385/147 |
| 2008/0019643 A1 * | 1/2008 | Teo ...................... | G02B 6/4292 385/76 |

* cited by examiner

*Primary Examiner* — Dalzid Singh
(74) *Attorney, Agent, or Firm* — Novak Druce Connolly Bove + Quigg LLP

(57) ABSTRACT

An optical subassembly testing system includes a pedestal, a rotation device, a holder and a supporting device. The rotation device includes a rotation member, a connecting plate and a retractable pillar. The rotation member is arranged on the pedestal and rotates relative to the pedestal. The connecting plate includes a mounting portion and a protruding portion, the mounting portion is arranged on the rotation member, the protruding portion extends away from the mounting portion and is exposed outside of the rotation member, and the retractable pillar is fixed perpendicular to the pedestal on an end of the protruding portion. The holder is fixed on an end of the retractable pillar and clamps a fiber connector. The supporting device includes a plurality of receiving grooves surrounding the pedestal, the receiving grooves are configured for receiving transmitter optical subassemblies (TOSAs) to test by aligning the fiber connector with each TOSA in turn.

12 Claims, 6 Drawing Sheets

OPTICAL SUBASSEMBLY TESTING SYSTEM

FIELD

The subject matter herein generally relates to optical communication technologies, and particularly to an optical subassembly testing system.

BACKGROUND

In optical communication systems, a transceiver generally includes a transmitter optical subassembly (TOSA) and a receiver optical subassembly (ROSA). The TOSA encloses a light-emitting device, typically a laser diode (LD), to emit light as signals, while the ROSA installs a light-receiving device, typically a photodiode (PD), to receive the light signals. To achieve a precise signal, it is needed to test the transceiver's performance after they have been manufactured.

BRIEF DESCRIPTION OF THE DRAWINGS

Implementations of the present technology will now be described, by way of example only, with reference to the attached figures.

DETAILED DESCRIPTION

Figure 1:
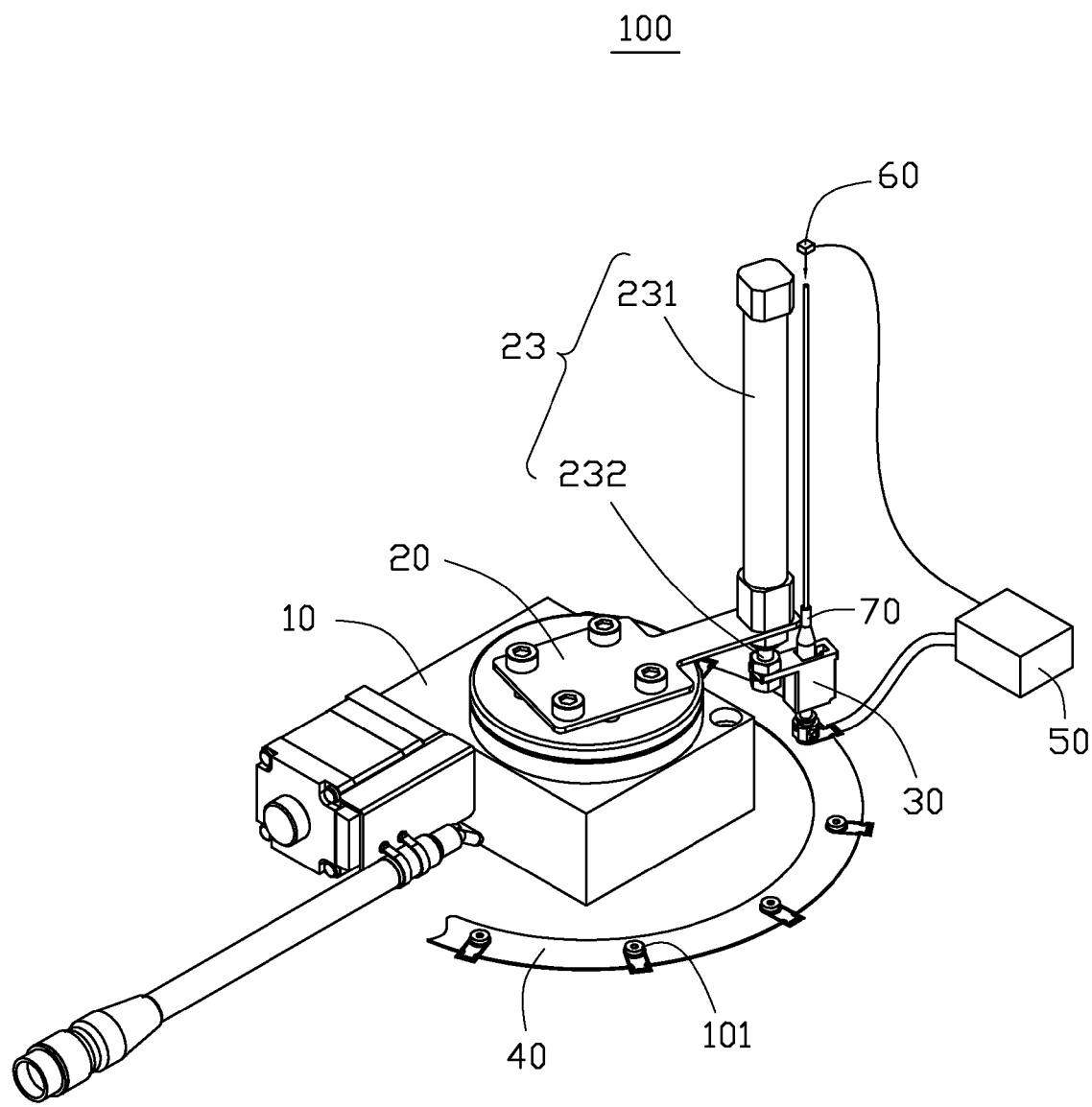
FIG. 1 is an isometric view of a first embodiment of an optical subassembly testing system for testing the performance of TOSAs, the optical subassembly testing system including a power supply, a fiber connector and a power meter.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" and "a number of" mean "at least two."

The disclosure is described in relation to a testing system and testing method for optical subassembly.

Figure 3:
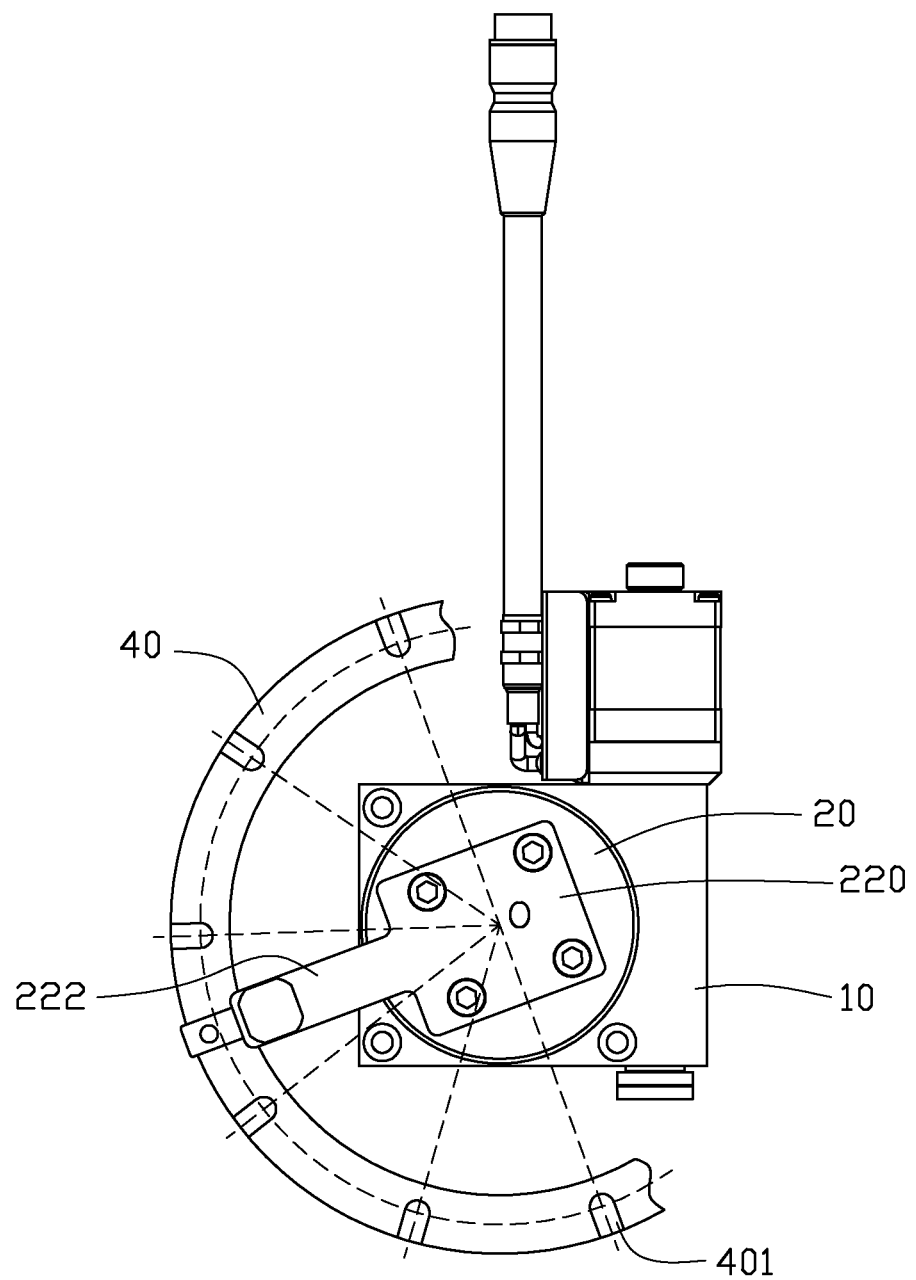
FIG. 3 is a top plan view of the optical subassembly testing system of FIG. 2.

FIG. 1 shows an optical subassembly testing system 100 according to a first embodiment. The testing system 100 is used for testing performance of transmitter optical subassemblies (TOSAs) 101. In detail, the TOSA 101 can emit light with a wavelength of about 850 nm, 1310 nm, and 1550 nm. The testing system 100 includes a pedestal 10, a rotation device 20, a holder 30, a supporting device 40, a power supply 50, a power meter 60 and a fiber connector 70. FIG. 3 shows a top plan view of the optical subassembly testing system 100, but the TOSAs 101, the fiber connector 70, the power supply 50, and the power meter 60 are removed.

Figure 2:
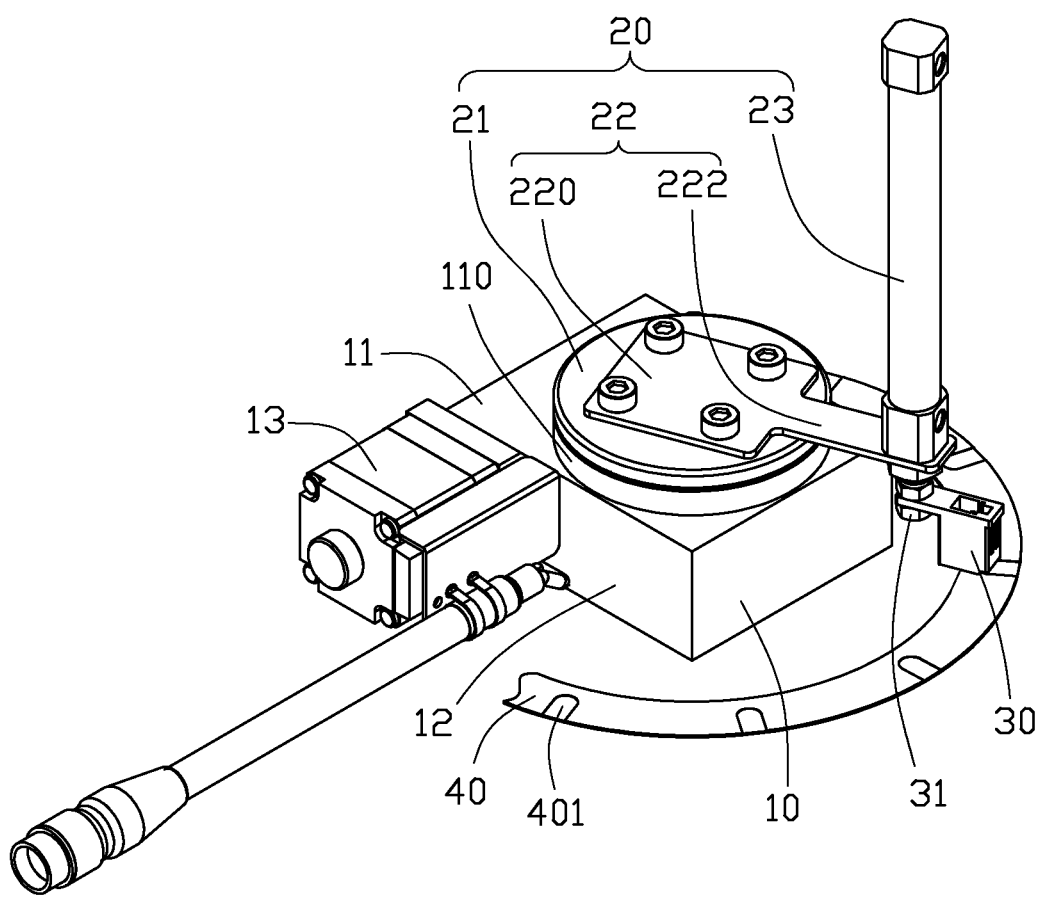
FIG. 2 is a similar view to FIG. 1, but the TOSAs, the fiber connector, the power supply, and the power meter are removed.

FIGS. 1-2 show that the pedestal 10 is substantially cuboid and includes a top surface 11 and a side surface 12. A circular projection 110 extends from the top surface 11. A motor 13 is mounted on the side surface 12.

The rotation device 20 includes a rotation member 21, a connecting plate 22, and a retractable pillar 23. The rotation member 21 is substantially circular in shape and is arranged on the pedestal 10 to be rotated relative to the pedestal 10. In at least one embodiment, the rotation member 21 is arranged on the circular projection 110, and the rotation member 21 is driven to rotate by the motor 13. The connecting plate 22 includes a mounting portion 220 and a protruding portion 222 connected with the mounting portion 220. The mounting portion 220 is assembled on the rotation member 21 via screws. The protruding portion 222 protrudes from the mounting portion 220 and is exposed outside the rotation member 21.

The retractable pillar 23 penetrates an end of the protruding portion 222 and is fixed therein. The retractable pillar 23 is perpendicular to the pedestal 10. The retractable pillar 23 includes a first rod 231 and a second rod 232 received in the first rod 231. The second rod 232 can be driven by a motor (not shown) when received in the first rod 231.

Figure 4:
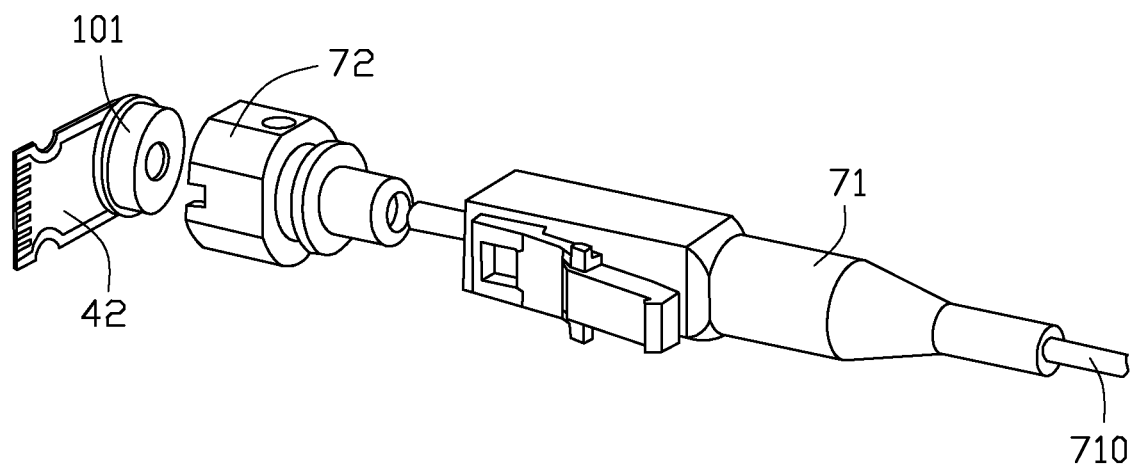
FIG. 4 is an isometric view showing the fiber connector aligned with one of the TOSAs.

The holder 30 is fixed to the second rod 232 and is configured for clamping a fiber connector 70. In detail, the second rod 232 runs through the holder 30, and two screws 31 engaging with the second rod 232 sandwich the holder 30 therebetween. FIG. 4 shows that the fiber connector 70 includes a fiber assembly 71 and a lens part 72. The fiber assembly 71 is configured for clamping an optical fiber 710. The lens part 72 is coupled with the optical fiber 710. The lens part 72 is configured for converging light emitted from the TOSA into the optical fiber 710.

The supporting device 40 defines a number of receiving grooves 401 surrounding the pedestal 10. In at least one embodiment, the supporting device 40 is substantially a ring-shaped plate, and is arranged around the pedestal 10. In this embodiment, the number of the receiving grooves 401 is six, but it is understood that the number of receiving grooves 401 is not limited to being six. The receiving grooves 401 are configured for receiving the TOSAs 101. The fiber connector 70 is aligned with one of the TOSAs 101. Each of the receiving grooves 401 defines a central point. Distances between each of the central points and a central axis of the rotation device 20 are equal to each other. The central points are substantially equidistant from each other around the rotation device 20.

The power supply 50 is electrically connected with one of the TOSAs 101, and is configured for providing power for the TOSAs 101. FIGS. 1 and 4 show that each TOSA 101 is arranged and connected with a printed circuit board (PCB) 42. The PCB 42 is electrically connected to the power supply 50. The PCB 42 includes an IC chip and is configured for driving the TOSA 101 to emit light. The light emitted from the TOSA 101 is optically coupled into the fiber connector 70. The power meter 60 is configured for detecting a power of the light output from the fiber connector 70 and determining the level of performance of each TOSA 101. In detail, the power meter 60 determines a range of the actual power output as a deviation from that of an ideal TOSA 101.

Figure 5:
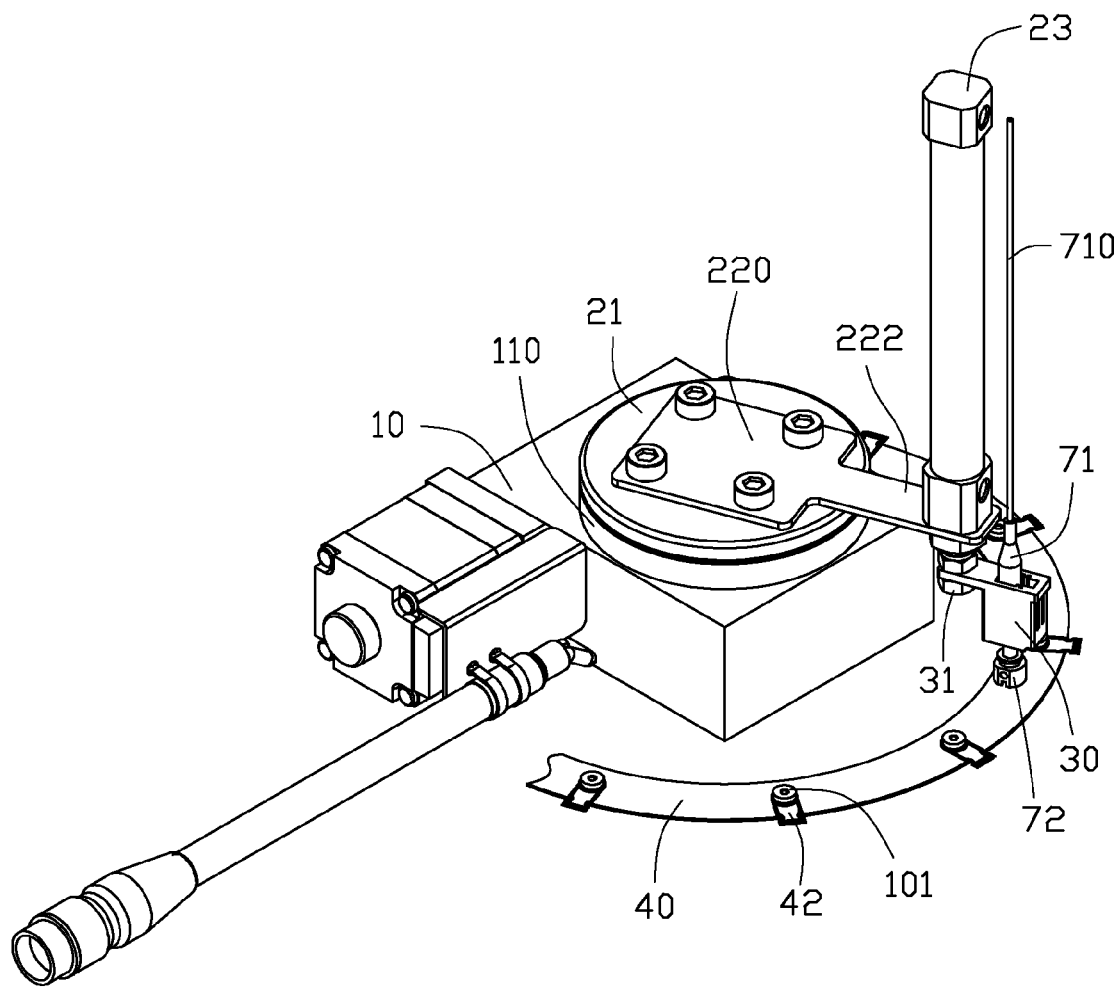
FIG. 5 is a similar view to FIG. 1, but the power supply and the power meter are removed.

FIGS. 2 and 4-5 show the testing system 100 in use. The second rod 232 is driven to extend from the first rod 231 to couple the fiber connector 70 with the TOSA 101. The TOSA 101 is driven by the PCB 42. Light emitting from the TOSA 101 is concentrated by the lens part 71, and transmitted by the fiber connector 70, to be detected by the power meter 60. The power meter 60 analyzes the power of the light and determines whether or not the TOSA 101 has a good performance. After testing the first TOSA 101, the driving device 20 rotates about a certain angle to align the next TOSA 101 with the fiber connector 70, and the next TOSA 101 can be tested in turn according to the above steps.

Figure 6:
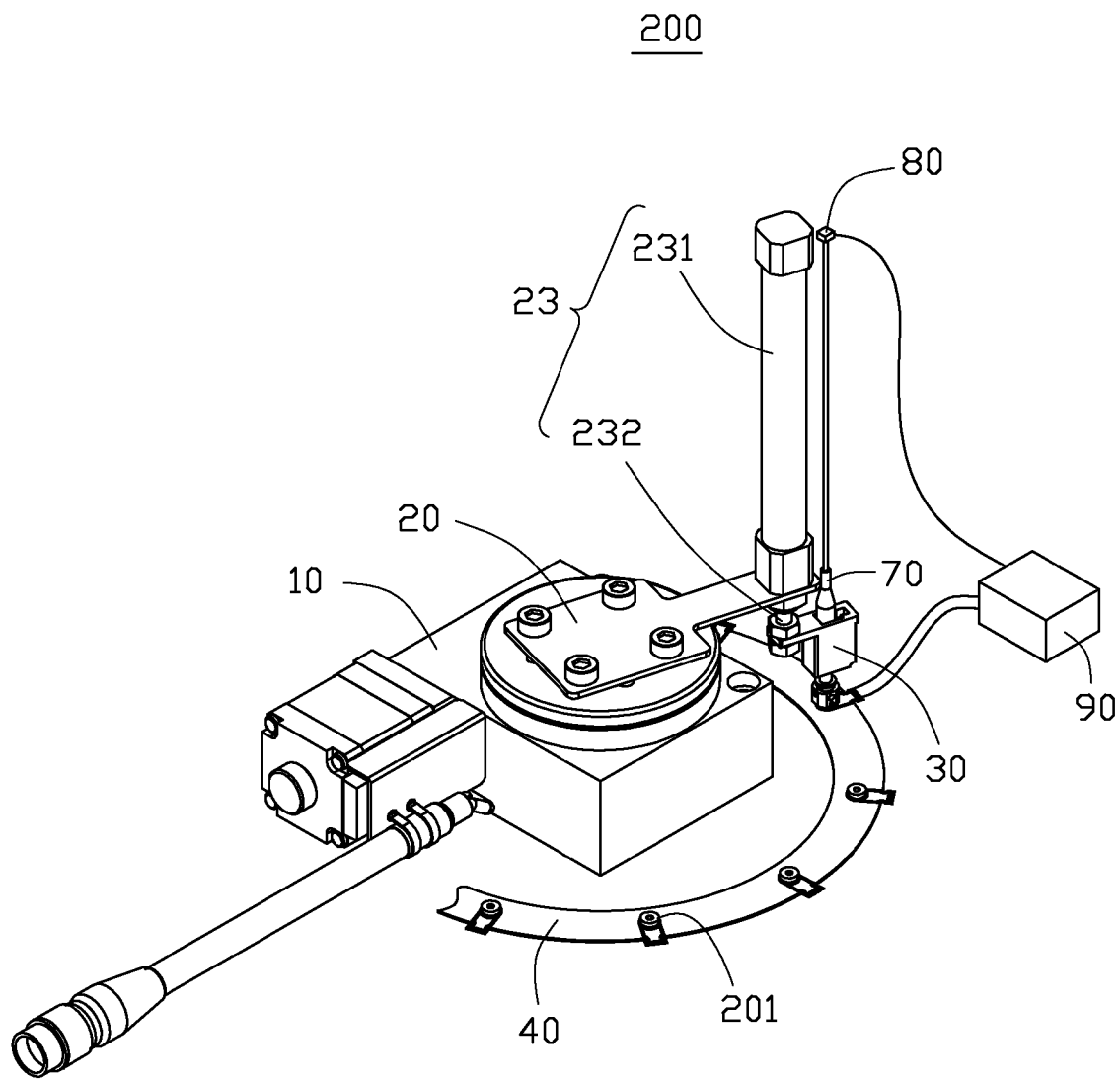
FIG. 6 is an isometric view of a second embodiment of an optical subassembly testing system for testing the performance of ROSAs, the optical subassembly testing system including a laser diode, a fiber connector and an optical analyzer.

FIG. 6 shows a testing system 200 according to a second embodiment. The testing system 200 is used for testing performance of the receiver optical subassemblies (ROSAs) 201. The difference between the testing system 200 and the testing system 100 of the first embodiment is that the power meter 60 is replaced by a laser diode (LD) 80 and the power supply 50 is replaced by an optical analyzer 90. The laser diode 80 is fixed at one end of the optical fiber 710 and is aligned with the fiber connector 70. The laser diode 80 moves with the movement of the retractable pillar 23. Light emitted from the laser diode 80 is coupled into the fiber connector 70 and then received by one of the ROSAs 201. One of the ROSAs 201 is connected with the optical analyzer 90. The optical analyzer 90 is configured for detecting the wavelength of the light from a ROSA 201, and determining whether or not the ROSA 201 has a good performance.

The embodiments shown and described above are only examples. Many details are often found in the art such as other features of a protection system and protection method. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical subassembly testing system comprising:
  a pedestal;
  a rotation device comprising a rotation member, a connecting plate and a retractable pillar, the rotation member is arranged on the pedestal and able to rotate relative to the pedestal, the connecting plate comprising a mounting portion and a protruding portion connected with the mounting portion, the mounting portion is arranged on the rotation member, the protruding portion extending away from the mounting portion and exposed outside the rotation member, the retractable pillar penetrates an end of the protruding portion and is fixed therein, the retractable pillar is perpendicular to the pedestal;
  a holder fixed on an end of the retractable pillar and clamps a fiber connector; and
  a supporting device defining a plurality of receiving grooves surrounding the pedestal, the receiving grooves are configured for receiving transmitter optical subassemblies (TOSAs) to test, by aligning the fiber connector with each TOSA in turn.

2. The optical subassembly testing system of claim 1, further comprising a power supply and a power meter, the power supply is electrically coupled with one of the TOSA and configured for providing power for the TOSA to drive the TOSA to emit light, the light emitted from the TOSA is optically coupled into the fiber connector, and the power meter is configured for detecting a power of the light output from the fiber connector, and determining whether or not the TOSA has a good performance.

3. The optical subassembly testing system of claim 1, wherein the pedestal is substantially cubic.

4. The optical subassembly testing system of claim 3, wherein the pedestal comprises a top surface and a circular projection extending from the top surface, the rotation member is located on the circular projection.

5. The optical subassembly testing system of claim 1, wherein the supporting device is substantially a ring plate, and arranged around the pedestal.

6. The optical subassembly testing system of claim 5, wherein each of the receiving grooves defines a central point, wherein distances between the central points and a central axis of the rotate device are equal to each other.

7. The optical subassembly testing system of claim 6, wherein distances between each two adjacent receiving grooves are equal to each other.

8. The optical subassembly testing system of claim 7, wherein the fiber connector comprises a fiber assembly and a lens part, the fiber assembly is configured for clamping an optical fiber, the lens part is coupled with the optical fiber.

9. The optical subassembly testing system of claim 1, wherein the retractable pillar comprises a first rod and a second rod received in the first rod, the second rod is able to extend in the first rod.

10. The optical subassembly testing system of claim 1, wherein the holder is fixed at the end of the second rod by screws.

11. An optical subassembly testing system comprising:
  a pedestal;
  a rotation device comprising a rotation member, a connecting plate and a retractable pillar, the rotation member is arranged on the pedestal and able to rotate around its central axis, the connecting plate comprising a mounting portion and a protruding portion connected with the mounting portion, the mounting portion is arranged on the rotation member, the protruding portion extending away from the mounting portion and are exposed outside of the rotation member, the retractable pillar penetrates an end of the protruding portion and is fixed therein, the retractable pillar is perpendicular to the pedestal;
  a holder fixed on an end of the retractable pillar and configured for clamping a fiber connector, the fiber connector comprising a fiber assembly and a lens part, the fiber assembly is configured for clamping an optical fiber, the lens part is coupled with the optical fiber; and a supporting device defining a plurality of receiving grooves surrounding the pedestal, the receiving grooves are configured for receiving receiver optical subassemblies (ROSAs) to test by aligning the fiber connector with each ROSA in turn.

12. The optical subassembly testing system of claim 11, wherein further comprising a laser diode and an optical analyzer, the laser diode is fixed at one end of the optical fiber of the fiber connector and aligned with the fiber connector, such that light emitted from the laser diode is able to couple into the fiber connector and is received by the ROSA, wherein one of the ROSAs is connected with the optical analyzer and the optical analyzer is configured for detecting the wavelength of the light from the ROSA and determining whether or not the ROSA has a good performance.

* * * * *